US008495062B2

(12) United States Patent
Grover (10) Patent No.: US 8,495,062 B2
(45) Date of Patent: Jul. 23, 2013

(54) SYSTEM AND METHOD FOR GENERATING SEARCH TERMS

(75) Inventor: Douglas M. Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 419 days.

(21) Appl. No.: 12/509,185

(22) Filed: Jul. 24, 2009

(65) Prior Publication Data
US 2011/0022609 A1  Jan. 27, 2011

(51) Int. Cl.
*G06F 17/30* (2006.01)

(52) U.S. Cl.
USPC .......................................................... 707/732

(58) Field of Classification Search
USPC ................. 707/694, 705, 706, 709, 729, 730, 707/732
See application file for complete search history.

(56) References Cited

U.S. PATENT DOCUMENTS

| 5,884,309 | A  | * | 3/1999  | Vanechanos, Jr. ..................... 1/1 |
| 6,327,590 | B1 |   | 12/2001 | Chidlovskii et al. |
| 6,397,212 | B1 |   | 5/2002  | Biffar |
| 6,484,164 | B1 | * | 11/2002 | Nikolovska et al. ................... 1/1 |
| 6,584,460 | B1 |   | 6/2003  | Iwayama et al. |
| 6,748,375 | B1 | * | 6/2004  | Wong et al. ............................ 1/1 |
| 6,907,423 | B2 |   | 6/2005  | Weil et al. |
| 7,219,131 | B2 | * | 5/2007  | Banister et al. ............... 709/206 |
| 7,483,891 | B2 | * | 1/2009  | Liu et al. ................................ 1/1 |
| 7,747,693 | B2 | * | 6/2010  | Banister et al. ............... 709/206 |
| 7,769,648 | B1 | * | 8/2010  | Nolan .............................. 705/32 |
| 8,145,521 | B2 | * | 3/2012  | Sah et al. .................... 705/14.49 |
| 2001/0049826 | A1 | * | 12/2001 | Wilf .............................. 725/120 |
| 2004/0103090 | A1 |   | 5/2004  | Dogl et al. |
| 2004/0181525 | A1 | * | 9/2004  | Itzhak et al. ....................... 707/5 |
| 2004/0215612 | A1 | * | 10/2004 | Brody ............................... 707/3 |
| 2005/0154746 | A1 | * | 7/2005  | Liu et al. ....................... 707/101 |
| 2005/0240580 | A1 |   | 10/2005 | Zamir et al. |
| 2005/0240999 | A1 | * | 10/2005 | Rubin et al. .................... 726/22 |
| 2005/0289099 | A1 |   | 12/2005 | Gromyko |

(Continued)

FOREIGN PATENT DOCUMENTS

WO  2007068881  6/2007

OTHER PUBLICATIONS

Berners-Lee, Tim, et al., "The Semantic Web, a New Form of Web Content That is Meaningful to Computers Will Unleash a Revolution of New Possibilities," Scientific American, May 2001, from archival website  http://www.scientificamerican.com/article.cfm?id=the-semantic-web&offset=6 . . . , 14 pages.

(Continued)

*Primary Examiner* — Cam-Linh Nguyen (57) ABSTRACT

A text object(s) such as a document containing a plurality of text items (e.g., chapters, paragraphs, etc.) is used to generate a search term. At least one, but not all, of the text items in the text object are selected based on a profile. The selected text item(s) are parsed to generate one or more search terms. This allows a user to drag-and-drop a graphical text object into a search engine icon to automatically perform a search based on the profile. Alternatively, a non-text object (e.g., an image) containing any identifiable item is used to generate the search term. Based on the profile, the item is parsed to generate a text representation of the item. The text representation of the item is used to generate one or more search terms.

45 Claims, 5 Drawing Sheets

U.S. PATENT DOCUMENTS

| | | | |
|---|---|---|---|
| 2006/0020596 A1* | 1/2006 | Liu et al. | 707/6 |
| 2006/0047649 A1* | 3/2006 | Liang | 707/4 |
| 2006/0200461 A1 | 9/2006 | Lucas et al. | |
| 2006/0235816 A1* | 10/2006 | Yang et al. | 707/1 |
| 2007/0100822 A1* | 5/2007 | Freeman et al. | 707/6 |
| 2007/0204063 A1* | 8/2007 | Banister et al. | 709/238 |
| 2007/0288432 A1 | 12/2007 | Weltman et al. | |
| 2008/0028036 A1* | 1/2008 | Slawson et al. | 709/217 |
| 2008/0052262 A1 | 2/2008 | Kosinov et al. | |
| 2008/0077564 A1 | 3/2008 | Hattori | |
| 2008/0112690 A1* | 5/2008 | Shahraray et al. | 386/124 |
| 2008/0183710 A1* | 7/2008 | Serjeantson et al. | 707/8 |
| 2008/0209350 A1* | 8/2008 | Sobotka et al. | 715/762 |
| 2008/0244429 A1* | 10/2008 | Stading | 715/764 |
| 2009/0148071 A1* | 6/2009 | Ohwa et al. | 382/306 |
| 2009/0240668 A1* | 9/2009 | Li | 707/3 |
| 2009/0327272 A1* | 12/2009 | Koivunen | 707/5 |
| 2011/0023068 A1* | 1/2011 | Zeldis et al. | 725/61 |

OTHER PUBLICATIONS

Song, Rui, et al., "SVM Based Automatic User Profile Construction for Personalized Search," ICIC 2005, Part I, LNCS 3644, pp. 475-484 (1st page of article provided), Springer-Verlag, Berlin Heidelberg 2005.

\* cited by examiner

SYSTEM AND METHOD FOR GENERATING SEARCH TERMS

TECHNICAL FIELD

The system and method relates to the generation of search terms and in particular to generating search terms from objects based on a user defined profile.

BACKGROUND

Currently, there are systems that allow a user to select a text file as the basis for generating search terms. For example, U.S. Pat. No. 6,584,460 discloses a system that allows a user to select a document. The document is then scanned for word frequencies by extracting out common words such as "the," "and," and the like. The user is then presented with a list of words and then can select and/or delete words that the user wants and/or does not want to use in the search. The user can then select which documents to perform the search upon using the selected words from the word list.

One of the problems with this system is that it requires user interaction for each search. Every time a user does a search, the user is required to select/delete search terms in order to perform a search. Moreover, this system fails to recognize that different sections of documents may be more relevant to the search than other sections. Instead of allowing the user to define specific sections of a document to search, all sections of the documents are scanned for word frequencies. This results in more work for the user to sort through search terms that may not be relevant. In addition, this system cannot generate search terms for non-text documents/items such as Joint Photographic Experts Group (JPEG), Tag Image File Format (TIFF), Waveform Audio Format (WAV), and the like.

There are a variety of systems that allow for user-defined profiles to sort/rank search results after an initial search has been performed. For example, U.S. Patent Publication No. 2005/0240580 and U.S. Pat. No. 6,327,590 disclose systems where a user can create a profile that ranks search results. After the user enters search terms in a search engine and starts a search, the search results are reordered based on the ranking in the profile. The problem with these systems is that they do not generate search terms based on documents, images, audio files, and/or look at specific sections in objects to determine search terms. Instead, these systems focus on post-search processing.

SUMMARY

The system and method are directed to solving these and other problems and disadvantages of the prior art. In one embodiment, the system and method get a text object(s) such as a document, a web page, a Universal Resource Locator (URL) that points to a text object, and the like. The text object contains a plurality of text items such as sections, headings, chapters, headers, footers, and the like. At least one, but not all of the text items are selected based on a profile. The selected text items are parsed to generate one or more search terms. This allows a user to drag-and-drop a graphical text object icon into a graphical search engine icon to automatically perform a search based on the profile.

In a second embodiment, the system and method get a non-text object such as a Joint Photographic Experts Group (JPEG) file, a Tag Image File Format (TIFF) file, Waveform Audio Format (WAV), and the like. The non-text object contains an item. An item can be any item in the non-text object that is identifiable. For example, if the non-text object is an image, specific items within the image/frame, such as a person's face, a car, a mountain, and the like can be identified. If the non-text object is an audio object, specific items within the audio object, such as sounds, words, tones, and the like, can be identified. The item is parsed to generate a text representation of the item based on a profile. Search terms are generated based on the text representation of the item. This allows a user to drag-and-drop a graphical non-text object into a graphical search engine icon to automatically perform a search based on the profile.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
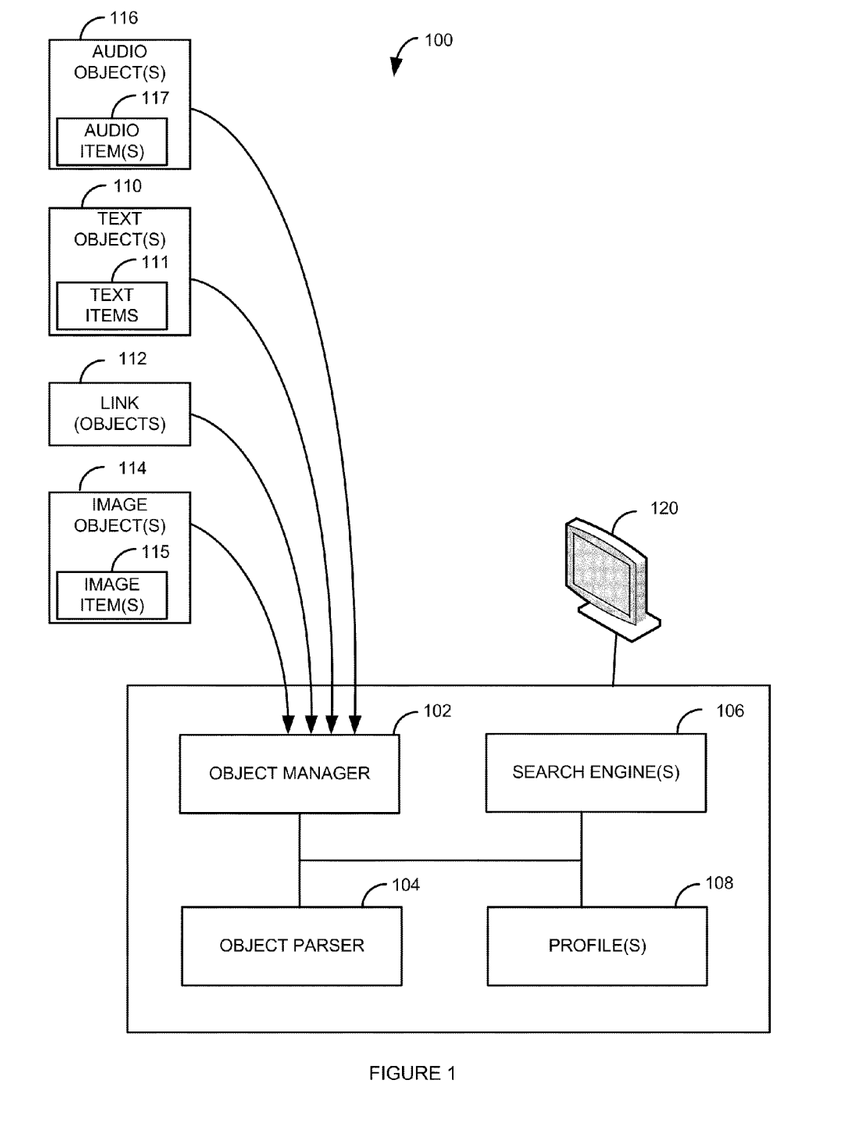
FIG. 1 is a block diagram of a first illustrative system for generating a search term for a search engine.

FIG. 1 is a block diagram of a first illustrative system 100 for generating a search term for a search engine 106. The first illustrative system 100 comprises an object manager 102, an object parser 104, the search engine(s) 106, profile(s) 108, text object(s) 110, link object(s) 112, image object(s) 114, audio objects 116, and a display 120. The object manager 102 can be any device/software that can manage objects such as an operating system, a personal computer, a network server, a network appliance, and the like. The object parser 104 can be any device/software that can parse objects such as an operating system, a personal computer, a network server, a network appliance, a speech recognition module, an Optical Character Recognition (OCR) module, and the like. The search engine 106 can be any system/software capable of performing searches of documents, web pages/servers, and the like (e.g., the Google™ search engine). The profile 108 can be anything capable of storing information such as a file, an Extended Mark up Language (XML) file, a document, and the like. The display 120 can be any device capable of displaying images, such as a television, a Liquid Crystal Display, a plasma display, and the like.

The object manager 102, the object parser 104, the search engine(s) 106, the profile(s) 108, the text object(s) 110, the link object(s) 112, the image object(s) 114, and the audio object(s) 116 are shown for illustrative purposes grouped together on the same system. For example, the object manager 102, the object parser 104, the search engine(s) 106, the profile(s) 108, the text object(s) 110, the link object(s) 112, the image object(s) 114, and the audio object(s) 116 can all reside on an individual personal computer. Alternatively, the object manager 102, the object parser 104, the search engine(s) 106, the profile(s) 108, the text object(s) 110, the link object(s) 112, the image object(s) 114, and the audio object(s) 116 can be distributed across multiple devices on a network (not shown).

The text object 110 can be any object that is text-searchable such as a text document, an American Standard Code for Information Interchange (ASCII) file, a web page, and the like. The text object 110 can be a folder/directory that contains one or more text objects 110. The text object 110 can also contain other objects such as link objects 112, image objects 114, and/or audio objects 116. The text object 110 contains a plurality of text items 111. A text item 111 can be any text-related item that can be distinguished from another item/object (e.g. an image item 115, an image object 114, a text item 111, an audio item 117, and an audio object 116), such as a section, a paragraph, a title, a header, a footer, an abstract, a description, text with a specific font, text with a specific font size, text with a specific color, text identified by bullets, numeric text, alpha-text, bold text, italicized text, underlined text, a selected group of text, and the like. A text item 111 could be a single word or letter. The text item 111 can be in a document that tracks changes that are made by various users of the document. For example, the text item 111 can be the changed text in the document, text changed by a specific person in the document, only unchanged text in the document, and file properties of the document. The text item 111 can be in a text item 111 pointed to by a Universal Resource Locator (URL), a text of a programmatic object (e.g., a C++ object), text within source code on a web page, hidden text on a web page, and the like.

The link object 112 can be any link-based object such as a link to a web page, a Universal Resource Locator (URL), a link to a file, a link to multiple web pages, a link to a web server, and the like. The link object 112 can be a link to any kind of object and/or multiple objects such as text objects 110, image objects 114, and/or audio objects 116.

The image object 114 can be any image object such as a JPEG file, a TIFF file, an imaged Portable Document Format (PDF) file, a video file, a Moving Picture Experts Group (MPEG) file. The image object 114 can also contain a text object 110, a link object 112, and an audio object 116. The image object 114 contains one or more image items 115. An image item 115 can be any image-based item within the image object 114 that can be distinguished from another object/item such as a person's face, a car, image text that can be detected with Optical Character Recognition, and the like. An image object 114 can contain a single image item 115.

The audio object 116 can be any audio object such as Waveform Audio Format (WAV) file, a MPEG 1 Audio Layer 3 (MP3) file, and the like. The audio object 116 can also contain a text object 110, a link object 112, and an image object 114. The audio object 116 also contains one or more audio items 117. An audio item 117 can be any sound/frequency that can be distinguished from another object/item such as a specific sound, a specific word, a specific letter, a specific person's voice, a sound, and the like. An audio object 116 can contain a single audio item 117.

The object manager 102 gets a text object(s) 110. This can be done in multiple ways such as the user performing a drag-and-drop of a text file(s), a drag-and-drop of directory of text files, a drag-and-drop of a URL(s) (link object 112), a drag-ad-drop of text of a web page(s), getting the text object 110 from a preconfigured directory defined in the profile 108, and the like. If the user drags-and-drops a URL, the object manager 102 will get the location of the URL and parse the text object 110 that the URL points to. The text object 110 contains a plurality of text items 111. The object manager 102 selects at least one, but not all of the plurality of text items 111 based on the profile 108. The profile 108 can contain instructions to select a specific text item 111, to select at least one, but not all of the plurality of text items 111, not to select a specific text item 111, to select a specific text item 111 based on a file type, not to select a specific text item 111 based on a file type, and the like. The instruction in the profile 108 can be to select a specific text item 111 in a plurality of text objects 110, not to select a specific text item 111 in the plurality of text objects 110, or other various combinations, and the like.

The object parser 104 parses the selected text item(s) 111 to generate one or more search terms. The object parser 104 can parse the selected text item(s) 111 using various known techniques such as eliminating common words such as "and," "the," and the like. The object parser 104 can parse based on word ranking, terms/words in the profile 108, and the like. The object parser 104 sends the search term(s) to the search engine 106. The search engine 106 generates search results based on the search term(s), and the search results are displayed in the display 120.

Figure 2:
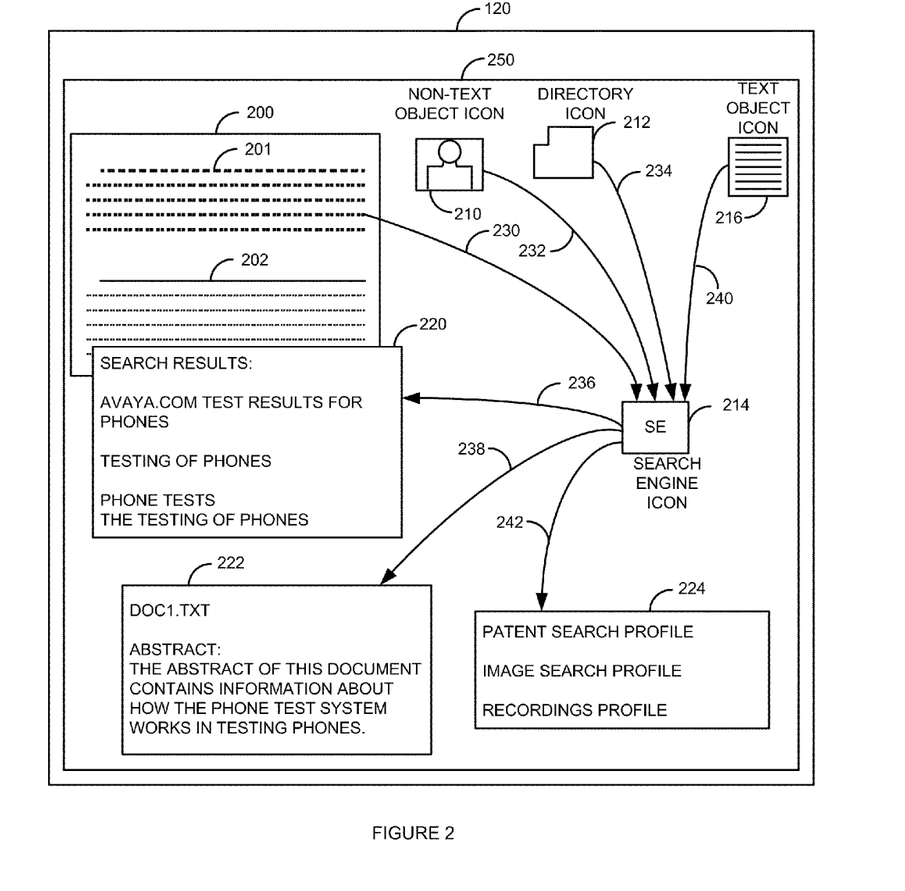
FIG. 2 is a diagram of a graphical interface for dragging-and-dropping objects into a search engine icon in a display.

FIG. 2 is a diagram of a graphical interface 250 for dragging-and-dropping objects onto a search engine icon 214 in the display 120. The graphical interface 250 comprises text object window 200, a search results window 220, an object item window 222, a profile window 224, a non-text object icon 210, a directory icon 212, the search engine icon 214, and a text object icon 216. The text object window 200 contains text such as the text of a document. The text object window 200 can contain selected text 201 and non-selected text 202. Text in the text object window 200 can be selected by use of a mouse, use of keys, use of touch screens, and the like. The non-text object icon 210, the directory icon 212, and the text object icon 216 are graphical representations of objects that can be parsed. The search engine icon 214 is a graphical representation of the search engine 106.

A user selects the text object icon 216 using a mouse or other method. In addition, the user could also select additional text object icons 216 using various techniques. The user drags-and-drops 240 the text object icon(s) 216 onto the search engine icon 214. This results in the object manager 102 getting the text object 110 represented by the text object icon 216. The object manager 102 selects at least one, but not all of the text items 111 in the text object 110 represented by the text object icon 216 based on the profile 108. The object parser 104 parses the selected text item(s) 111 to generate a search term. The search term is sent to the search engine 106 represented by the search engine icon 214. The search engine 106 represented by the search engine icon 214 generates search results. The search results are displayed 236 in the search results window 220.

A user selects the directory icon 212 or a link icon (not shown) using a mouse or other method. In addition, the user could also select additional directory icons 212 (or link icons). The user drags-and-drops 234 the directory icon(s) 212 or link icons onto the search engine icon 214. This results in the object manager 102 getting the text object(s) 110 in the directory (or text object(s) 110 pointed to by the link object 112) represented by the directory icon 212. The object manager 102 selects at least one, but not all of the text items 111 in the text object(s) 110 in the directory represented by the directory icon (or link icon) 212 based on the profile 108. The object parser 104 parses the selected text item(s) 111 to generate a search term. The search term is sent to the search engine 106 represented by the search engine icon 214. The search engine 106 represented by the search engine icon 214 generates search results. The search results 236 are displayed in the search results window 220.

A user selects text from the text object window 200. In addition, the user could also select additional text from other text object windows 200. The user drags-and-drops 230 the selected text 201 onto the search engine icon 214. The object manager 102 selects at least one, but not all of the text items 111 in the selected text 201 based on the profile 108. The object parser 104 parses the selected text item(s) 111 to generate a search term. The search term is sent to the search engine 106 represented by the search engine icon 214. The search engine 106 represented by the search engine icon 214 generates search results. The search results are displayed 236 in the search results window 220.

A user selects the non-text object icon 210 using a mouse or other method. In addition, the user could also select additional non-text object icons 210. The non-text object icon 210 could represent an image object 114 or an audio object 116. The user drags-and-drops 232 the non-text object icon(s) 210 onto the search engine icon 214. This results in the object manager 102 getting the non-text object (114 and/or 116) represented by the non-text object icon 210. The object manager 102 gets an image item(s) 115 or an audio item(s) 117 in the non-text object (114 and/or 116) represented by the non-text object icon 210 based on the profile 108. The object parser 104 parses the non-text item(s) (117 and/or 115) to generate a text representation of the non-text item(s) (117 and/or 115). For example, if the non-text object is an image object 114 and the profile 108 contains an instruction to identify a car in the image object 114, and if a car is detected in the image object 114, the search term generated would be "car." If the non-text object is an audio object 116 (e.g., a WAV file), the instruction in the profile 108 may be to identify a particular person's voice (audio item 117) or some other sound. If the person's voice is found in the audio object 116 the search term(s) generated may be the person's name and/or some other text associated with that person. The parser 104 can convert an audio object 116 to text using known techniques and then parse the generated text similarly to a text object 110. The object parser 104 parses the text representation of the non-text item to generate a search term. The object manager 102 sends the search term to the search engine 106 represented by the search engine icon 214. The search engine 106 represented by the search engine icon 214 generates search results. The search results are displayed 236 in the search results window 220.

The above process of dragging-and-dropping of objects is illustrated using the same type of objects. However, the dragging-and-dropping of different types of objects at the same time to perform the search by the search engine 106 can be done as well. For example, if the directory represented by the directory icon 212 contained a text object 110, a link object 112, an image object 114, and an audio object 116, search results could be generated by the parsed text from the text object 110, the generated text representation of the image object 114, the generated text representation of the image object 114, and from any text, image, or audio objects 116 represented by the link object 112 to create the search term(s). Another example can be where a full motion video file is the dragged-and-dropped object. The object parser 104 could parse the video of the video file to get a text representation of the video and parse the audio portion of the video file to get a text representation of the audio portion of the video file. Another example could be a text object that contains an image object. For example, when creating a text document, the user could insert an image into the document and then drag-and-drop the document. The document parser 104 could then parse both the image object and the text object within the same document.

In addition, there can be additional instruction(s) in the profile 108 to display an object item (111, 115, and/or 117) within the object that was dragged-and-dropped into the search engine icon 214. After the object is dropped onto the search engine icon 214, the parser 104—based on an instruction (e.g. to display the abstract of a document) in the profile 108—can display 238 the object in the object item window 222.

In FIG. 2, a text item 111 is displayed in the object item window 222 along with the document associated (DOC 1.TXT) with the text item 111. A similar system can be used for image items 115 and/or audio items 117. For example, the object parser 104—based on an instruction in the profile 108—can parse an image object 114 and identify the image item 115 within the image object 114; the object manager 102 will then display the image item 115 in the object item window 222 along with the file where the image object 114 is located. Likewise, the object parser 104—based on an instruction in the profile 108—can parse an audio object 116 and identify an audio item 117 in the audio object; the object manager 102 can then play the audio item 117 to a user along with naming, either graphically or vocally, the file where the audio is being played.

The user can have multiple profiles 108. For example, the user may have one profile 108 for searching specific types of documents and a second profile 108 for searching any other types of documents. If the system determines that the user has more than one profile 108, the profile window 224 is displayed 242 to the user. The user then selects which profile 108 to use to perform the search.

Figure 3:
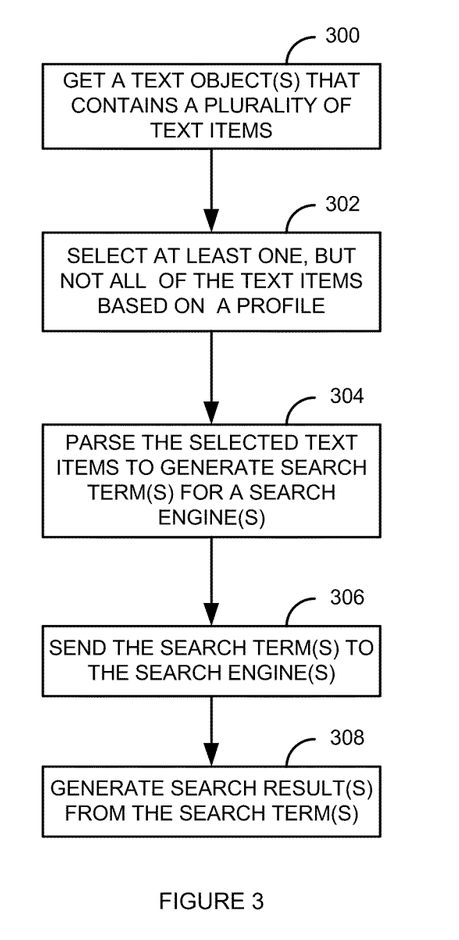
FIG. 3 is a flow diagram of a method for generating a search term for a search engine based on a text object.

FIG. 3 is a flow diagram of a method for generating a search term for a search engine 106 based on a text object 110. Illustratively, the object manager 102, the object parser 104, and the search engine 106 are stored-program-controlled entities, such as a computer, which perform the method of FIGS. 3-5 by executing a program stored in a storage medium, such as a memory or disk.

The process begins when an object manager 102 gets 300 a text object(s) 110 that contains a plurality of text items 111. The object manager 102 selects 302 at least one, but not all of the text items 111 based on a profile 108. The parser 104 parses 304 the selected text item(s) 111 to generate search term(s) for a search engine 106. The object manager 102 sends 306 the search term(s) to the search engine 106. The search engine 106 generates 308 search results from the search term(s).

Figure 4:
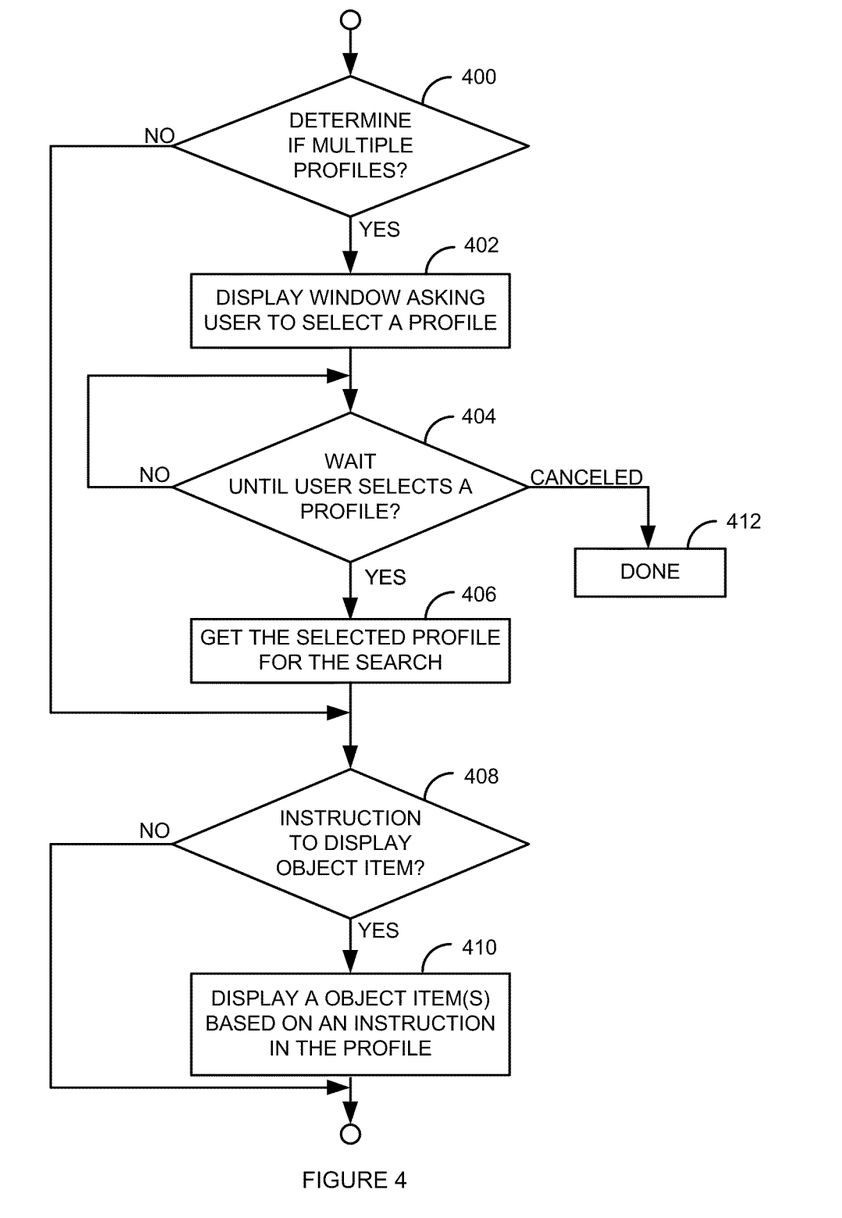
FIG. 4 is a flow diagram of a method for asking a user to select a profile to generate a search term for a search engine.

FIG. 4 is a flow diagram of a method for asking a user to select a profile 108 to generate a search term for a search engine 106. This process can use any type of object. The process determines 400 if the user has multiple profiles 108. If there are not multiple profiles 108 in step 400, the process goes to step 408. Otherwise, if there are multiple profiles 108 in step 400, the process displays 402 a profile window 224 asking the user to select a profile 108 that the user wants to use. The process waits 404 until the user selects a profile 108. If the user cancels in step 404, the process is done 410. Otherwise, if the user selects a profile 108 in step 404, the process gets 406 the selected profile 108 to be used for the search. The process determines 408 if there is an instruction in the profile 108 to display an object item. If there is not an instruction to display an object item in step 408, the process is done. Otherwise, if there is an instruction to display an object item in step 408, the process displays 410 the object item(s) in the object item window 222 based on the instruction in the profile 108. The process is then done.

Figure 5:
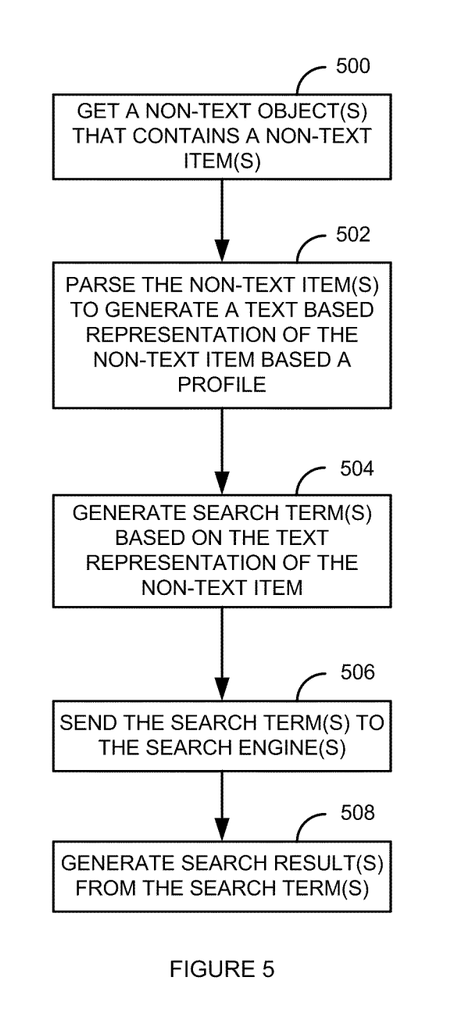
FIG. 5 is a flow diagram of a method for generating a search term for a search engine based on a non-text object.

FIG. 5 is a flow diagram of a method for generating a search term for a search engine 106 based on a non-text object. The process begins when the object manager 102 gets 500 a non-text object (e.g., an image object 114 or an audio object 116). The non-text object contains a non-text item(s). The parser 104 parses 502 the non-text item(s) to generate a text representation of the non-text item(s) based on a profile 108. The parser 104 generates 504 search term(s) based on the text representation of the non-text item. The object manager 102 sends 506 the search term(s) to the search engine 106. The object manager 102 could send the search term to more than one search engine 106. The search engine 106 generates 508 search result(s) from the search term(s).

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer-implemented method for generating a search term comprising:
   in a computer system:
   a. defining a profile based on a selection made by a user;
   b. getting a text object, wherein the text object contains a plurality of text items, at least one of the plurality of text items comprising a text item pointed to by a Universal Resource Locator (URL);
   c. selecting at least one, but not all of the text items based on the profile;
   d. parsing only the selected text items to generate the search term; and
   e. creating a search based on the search term and a selection of a search engine made by the user.

2. The method of claim 1, wherein the text object is at least one of the following: one or more files, one or more Universal Resource Locators and/or one or more web pages.

3. The method of claim 1, wherein at least one of the plurality of text items is selected from the group comprising: a title, a header, a footer, an abstract, a description, text with a specific font, text with a specific font size, text with a specific color, text identified by bullets, numeric text, alpha-text, bold text, italicized text, and underlined text.

4. The method of claim 1, wherein at least one of the plurality of text items is selected from the group comprising: changed text, text changed by a specific person, and only unchanged text.

5. The method of claim 1, wherein at least one of the plurality of text items is selected from the group comprising: a text of a programmatic object, text within source code on a web page, and hidden text on a web page.

6. The method of claim 1, wherein selecting the at least one, but not all of the plurality of text items comprises at least one of the following: not selecting a specific text item, and not selecting a specific text item based on a file type.

7. The method of claim 1, wherein the text object is a plurality of text objects, and wherein selecting the at least one, but not all of the plurality of text items comprises selecting a specific text item in each of the plurality of text objects based on the profile.

8. The method of claim 7, wherein selecting the at least one, but not all of the plurality of text items further comprises not selecting a specific text item in each of the plurality of text objects.

9. The method of claim 1, further comprising the steps of sending the search term to the search engine and generating search results in the search engine based on the search term.

10. The method of claim 1, wherein the text object further comprises a non-text object containing an non-text item, and further comprising the steps of:
    d. parsing the non-text item to generate a text representation of the non-text item based on the profile; and
    e. generating the search term and/or an additional search term based on the text representation of the non-text item.

11. A computer-implemented method for generating a search term comprising:
    in a computer system:
    a. getting a non-text object containing a non-text item pointed to by a Universal Resource Locator (URL);
    b. based on a profile, parsing the non-text item to generate a text representation of the non-text item; and
    c. generating the search term from the text representation of the non-text item.

12. The method of claim 11, wherein the non-text object is selected from the group comprising an image object and an audio object.

13. The method of claim 11, further comprising the steps of sending the search term to a search engine and generating search results in the search engine based on the search term.

14. The method of claim 13, wherein the non-text object is graphically represented as a non-text object in a display, and wherein the search engine is graphically represented as a search engine in the display, and wherein the step of generating the search results is initiated based on a user dragging-and-dropping the graphically represented non-text object onto the graphically represented search engine.

15. A method for generating a search term comprising:
    a. in response to a user dragging-and-dropping a graphical representation of an object comprising a plurality of items, at least one of the plurality of items comprising an item pointed to by a Universal Resource Locator (URL), onto a graphical representation of a search engine on a display screen, selecting at least one but not all of the items based on a profile defined by a selection made by the user;
    b. parsing only the selected items to generate a search term; and
    c. performing a search with the search term by the search engine to generate search results.

16. The method of claim 15, further comprising: displaying the search results on the display.

17. The method of claim 15, wherein the profile indicates items of the non-text object that are to be used to generate the search term.

18. The method of claim 15, further comprising the step of displaying one of the items based on the profile.

19. The method of claim 15, wherein selecting comprises: selecting the profile from a plurality of stored profiles each indicating items that are to be used to generate a search term.

20. The method of claim 19, wherein selecting the profile comprises selecting the profile based on a type of the object.

21. A system for generating a search term comprising:
program instructions stored on a non-transitory storage medium, the program instructions comprising:
a. an object manager for obtaining a text object containing a plurality of text items, at least one of the plurality of text items comprising a text item pointed to by a Universal Resource Locator (URL), and for selecting at least one, but not all of the plurality of text items based on a profile defined by a selection made by a user and further configured to create a search based on the search term and a selection of a search engine made by the user;
b. an object parser for parsing only the selected text items to generate the search term; and
c. a processor configured to execute the program instructions.

22. The system of claim 21, wherein the text object is at least one of the following: one or more files, one or more Universal Resource Locators and/or one or more web pages.

23. The system of claim 21, wherein at least one of the plurality of text items is selected from the group comprising: a title, a header, a footer, an abstract, a description, text with a specific font, text with a specific font size, text with a specific color, text identified by bullets, numeric text, alphatext, bold text, italicized text, and underlined text.

24. The system of claim 21, wherein at least one of the plurality of text items is selected from the group comprising: changed text, text changed by a specific person, and only unchanged text.

25. The system of claim 21, wherein at least one of the plurality of text items is selected from the group comprising: a text of a programmatic object, text within source code on a web page, and hidden text on a web page.

26. The system of claim 21, wherein the parser is configured to select a specific text item, not select a specific text item, select a specific text item based on a file type, and not select a specific text item based on a file type.

27. The system of claim 21, wherein the text object is a plurality of text objects, and wherein the object manager is configured to select a specific text item in each of the plurality of text objects based on the profile.

28. The system of claim 27, wherein parser is further configured to not select a specific text item in each of the plurality of text objects.

29. The system of claim 21, wherein the object manager is further configured to send the search term to the search engine and the search engine is configured generate search results based on the search term.

30. The system of claim 21, wherein the text object further comprises a non-text object, containing an non-text item, and the object parser is further configured to parse the non-text item to generate a text representation of the non-text item based on the profile and generate the search term and/or an additional search term based on the text representation of the non-text item.

31. A system for generating a search term comprising:
program instructions stored on a non-transitory storage medium, the program instructions comprising:
a. an object manager configured to get a non-text object, containing a non-text item pointed to by a Universal Resource Locator (URL);
b. an object parser configured to parse the non-text item to generate a text representation of the non-text item based on a profile and generate the search term based on the text representation of the non-text item; and
c. a processor configured to execute the program instructions.

32. The system of claim 31, wherein the non-text object is selected from the group comprising an image object and an audio object.

33. The system of claim 31, wherein the object manager is further configured to send the search term to a search engine and the search engine is configured generate search results based on the search term.

34. The system of claim 33, wherein the non-text object is graphically represented as a non-text object in a display, wherein the search engine is graphically represented as a search engine in the display, and wherein generating the search results is initiated based on a user dragging-and-dropping the graphical representation of the non-text object onto the graphical representation of the search engine.

35. A system for generating a search term comprising:
a. in response to a user dragging-and-dropping a graphical representation of an object comprising a plurality of items, at least one of the plurality of items comprising an item pointed to by a Universal Resource Locator (URL), onto a graphical representation of a search engine on a display screen, an object manager configured to select at least one but not all of the items based on a profile defined by a selection made by the user;
b. an object parser configured to parse only the selected items to generate a search term; and
c. a search engine configured to perform a search with the search term to generate search results.

36. The system of claim 35, wherein the display is configured to display the search results.

37. The system of claim 35, wherein the profile indicates items of the object that are to be used to generate the search term.

38. The system of claim 35, wherein the display is configured to display one of the items based on the profile.

39. The system of claim 35, wherein the object manager is configured to select the profile from a plurality of stored profiles each indicating items that are to be used to generate a search term.

40. The system of claim 39, wherein the object manager is configured to select the profile based on a type of the object.

41. A computer-implemented method for searching non-text objects comprising:
in a computer system:
a. getting a non-text object, wherein the non-text object contains a non-text item pointed to by a Universal Resource Locator (URL);
b. parsing the non-text item to identify a non-text item defined in a profile; and
c. displaying or playing the identified non-text item.

42. A system for searching non-text objects comprising:
program instructions stored on a non-transitory storage medium, the program instructions comprising:
a. an object manager configured to get a non-text object, wherein the non-text object contains a non-text item pointed to by a Universal Resource Locator (URL);
b. a parser configured to parse the non-text item to identify a non-text item defined in a profile;
c. a display for displaying the identified non-text item or a player for playing the identified non-text item; and
d. a processor configured to execute the program instructions.

43. An apparatus for generating a search term comprising:
   a. means for defining a profile based on a selection made by a user;
   b. means for getting a text object, wherein the text object contains a plurality of text items, at least one of the plurality of text items comprising a text item pointed to by a Universal Resource Locator (URL);
   c. means for selecting at least one, but not all of the text items based on the profile;
   d. means for parsing only the selected text items to generate the search term; and
   e. means for creating a search based on the search term and a selection of a search engine made by the user.

44. An apparatus for generating a search term comprising:
   a. means for getting a non-text object containing a non-text item pointed to by a Universal Resource Locator (URL);
   b. based on a profile, means for parsing the non-text item to generate a text representation of the non-text item; and
   c. means for generating the search term from the text representation of the non-text item.

45. An apparatus for searching non-text objects comprising:
   a. means for getting a non-text object, wherein the non-text object contains a non-text item pointed to by a Universal Resource Locator (URL);
   b. means for parsing the non-text item to identify a non-text item defined in a profile; and
   c. means for displaying or playing the identified non-text item.

* * * * *

UNITED STATES PATENT AND TRADEMARK OFFICE
CERTIFICATE OF CORRECTION

PATENT NO.        : 8,495,062 B2
APPLICATION NO.   : 12/509185
DATED             : July 23, 2013
INVENTOR(S)       : Douglas M. Grover It is certified that error appears in the above-identified patent and that said Letters Patent is hereby corrected as shown below:

In the Specification

In column 3, line 56, delete "drag-ad-drop" and insert --drag-and-drop--.

In column 5, lines 49 and 50, delete "image object 114" and insert --audio object 116--.

In the Claims

In column 8, line 21, delete "d." and insert --f.--.

In column 8, line 23, delete "e." and insert --g.--.

In column 10, line 10, after "configured" insert --to--.

Signed and Sealed this
Twenty-fourth Day of June, 2014

Michelle K. Lee
*Deputy Director of the United States Patent and Trademark Office*